US007864416B2

(12) United States Patent  (10) Patent No.: US 7,864,416 B2
Huang et al.  (45) Date of Patent: Jan. 4, 2011

(54) PORTABLE ASTRONOMICAL TELESCOPE

(75) Inventors: Jianguo Huang, Foshan (CN); Lin Li, Foshan (CN); Jiandong Yang, Foshan (CN); Weimin Ma, Foshan (CN)

(73) Assignee: SPIM Precision Instruments Manufacturing Co., Ltd. (CN)

( * ) Notice: Subject to any disclaimer, the term of this patent is extended or adjusted under 35 U.S.C. 154(b) by 367 days.

(21) Appl. No.: 12/072,348

(22) Filed: Feb. 26, 2008

(65) Prior Publication Data

US 2009/0161211 A1  Jun. 25, 2009

(30) Foreign Application Priority Data

Dec. 25, 2007  (CN) .................... 2007 2 0178970 U

(51) Int. Cl.
*G02B 23/00* (2006.01)
(52) U.S. Cl. ...................... 359/399; 359/430
(58) Field of Classification Search ................. 359/399, 359/405–407, 430, 896
See application file for complete search history.

(56) References Cited

U.S. PATENT DOCUMENTS

| | | | | |
|---|---|---|---|---|
| 1,473,527 A | * | 11/1923 | Thimgren | .................... 359/399 |
| 6,467,738 B1 | * | 10/2002 | Hedrick et al. | .............. 248/164 |
| 7,048,238 B2 | * | 5/2006 | Rotondi | .................... 248/125.8 |
| 7,310,184 B2 | * | 12/2007 | Kuo | ........................... 359/399 |
| 2003/0058531 A1 | * | 3/2003 | Baun et al. | ................... 359/430 |
| 2006/0028720 A1 | * | 2/2006 | Harrelson | ................... 359/399 |
| 2006/0092508 A1 | * | 5/2006 | Baun et al. | ................... 359/429 |

* cited by examiner

*Primary Examiner*—Frank G Font
(74) *Attorney, Agent, or Firm*—Blank Rome LLP

(57) ABSTRACT

A portable astronomical telescope includes the cylinder body, on which three telescopic legs are hinged through a joint to form a tripod stand. The bottom of aforementioned cylinder body is fixed by means of connection element and mounted with part box. On the bottom end of this part box, a bottom cover is insert-mounted. On the upper end of the part box, limit connection elements of the connected telescopic leg are hinged. Within the aforementioned cylinder body, a guide bush is fixed and installed, inside of which telescope base is mounted. On the side of this telescope base, a guide pin is established. On the side of the guide sleeve, an L-shaped feed-through slot is established to accommodate the guide sleeve. On the tail end of the above feed-through slot, one guide pin residence slot is connected. The aforementioned telescope base is activated by the lug and mounted with bellows. This product can be used without need for separate assembly, and eliminates the need for a separate package. With small volume and light-weight features, it can hide the bellows within the cylinder body, in order to provide protection, which facilitates the product carrying and movement, particularly suitable for astronomy enthusiasts at the time of outdoor observation activities.

10 Claims, 6 Drawing Sheets

PORTABLE ASTRONOMICAL TELESCOPE

TECHNICAL FIELD

This application relates to the technical field of optical instruments, especially relating to one kind of portable astronomical telescope.

BACKGROUND TECHNOLOGY

Currently, the telescope is widely used in a variety of occasions which require the observation of long-distance objects. Its working principle is: by means of the magnification role of optical system, it can efficiently extend the human vision scope, so the naked eye can easily see things which are difficult to be observed at a distant place. For most astronomy enthusiasts, the astronomical telescope has become the necessary instrument to observe even the interstellar space. The astronomical telescopes on current markets usually adopt a vertical pipe rack structure, which means that, when used, the telescope tube should be plugged on the tripod for installation. Because the astronomical telescope usually involves outdoor application, the telescope tube and tripod will be separately packed in a package box in order to facilitate the carrying, and taken again from this box for assembly. This design is not only inconvenient for both carrying and movement, but also lacks overall protection for the telescope tube, which makes it difficult to meet the application demands.

SUMMARY

To overcome the insufficiencies of existing technology, the embodiments described herein include a portable astronomical telescope.

In a first embodiment, a portable astronomical telescope includes the cylinder body on which three telescopic legs are hinged through joint stand for tripods. The bottom of the cylinder body is fixed by means of connection elements and mounted with a part box. On the bottom of this part box, a bottom cover is insert-mounted. On the upper side of the part box, limit elements of the connected telescopic leg are hinge connected. Within the aforementioned cylinder body, a guide sleeve or bushing is fixed and installed, inside of which telescope_base is mounted. On the side of this telescope base, a guide pin is established. On the side of the guide sleeve, an L-shaped feed-through slot is established to accommodate the guide pin. On the lower end of the above feed-through slot, one guide pin residence slot is connected. The aforementioned telescope_base is activated by the lug and mounted with a telescope body.

As the improvement for above implementations, the aforementioned telescopic leg includes three pieces consisting of mutually interlinked inner, middle and outer pipe pieces. In the upper, outer pipe piece, the head is provided with a joint that is hinged on the joint stand, and the lower side has a location sleeve located within. In the middle pipe piece, the top is encased with a limit sleeve and the lower side has a limit sleeve for the middle pipe located within. In the inner pipe piece, the head or top is provided with a location sleeve for the middle pipe, and the bottom end is plugged by a toe sleeve. A pipe piece locking device is established at the connection point of aforementioned inner, middle, outer pipe pieces. The above pipe piece locking device incorporates a pipe lock sleeve encased outside of pipe pieces. This lock sleeve is hinged with one lock tongue. The hinged hole on the lock tongue adopts the eccentric settings. A pressure block may be tightly pressed on the inner pipe; it can touch the lock tongue mutually.

As the further improvement for above implementation methods, for the aforementioned telescope_base, three pieces of guide pins are evenly distributed along the side circumference. On the side of the above guide sleeve, in addition to the guide pin receiving slot, three L-shaped feed-through slots with the positions relative to the guide pin will also be set.

The_embodiment of the invention has following beneficial effects: this product can be used without need for separate assembly, and stored without need for separate package. With small volume and light-weight feature, it can hide the telescope body within the cylinder body, in order to provide good protection, which facilitates the product carrying and movement, particularly suitable for astronomy enthusiasts for use in outdoor observation activities.

BRIEF DESCRIPTION OF THE DRAWINGS

In the following, attached figures and examples will be combined to further explain the utility model.

DETAILED DESCRIPTION

Figure 1:
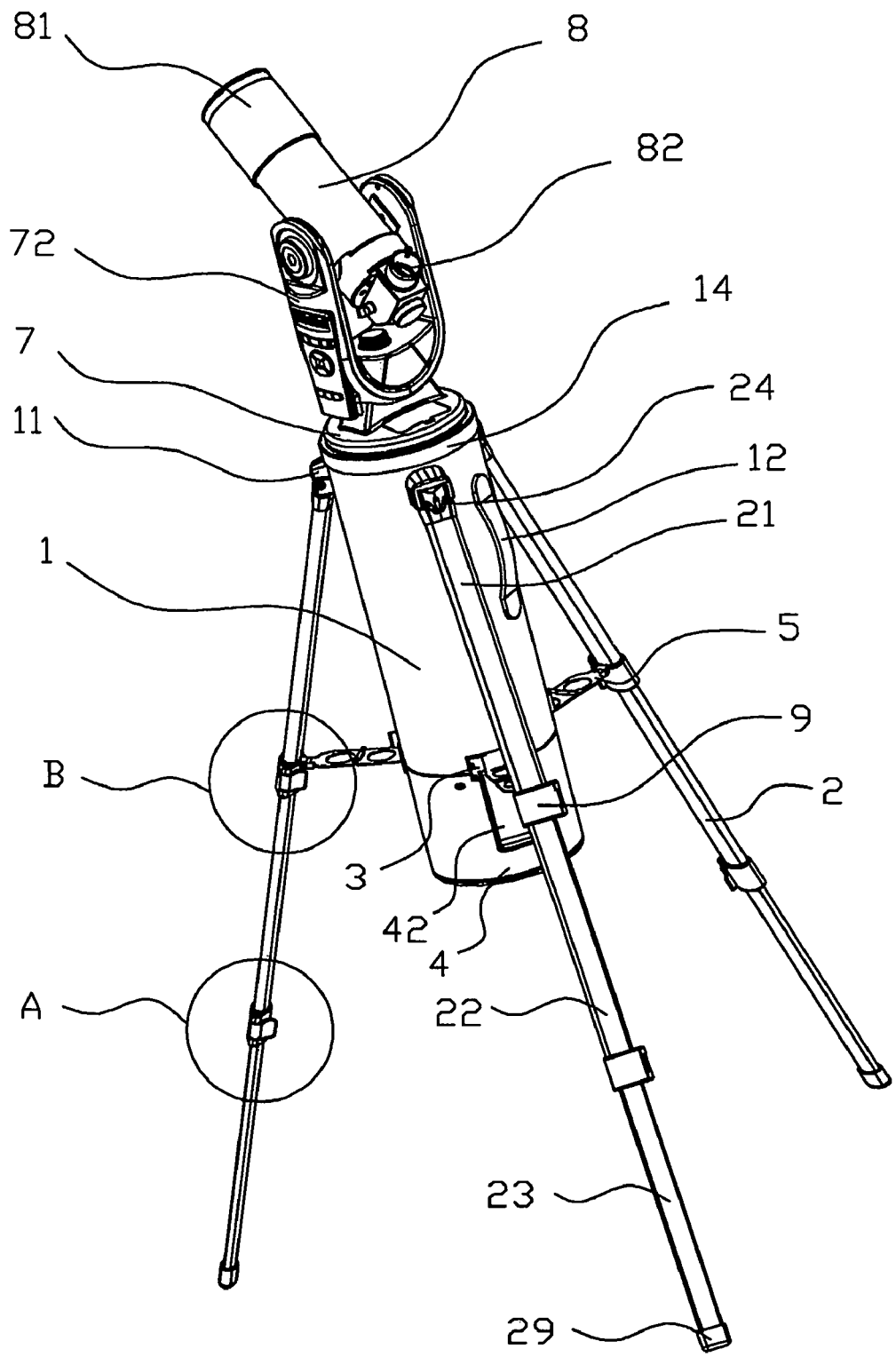
FIG. 1: a perspective assembly view of an embodiment of the invention in a deployed state.
Figure 2:
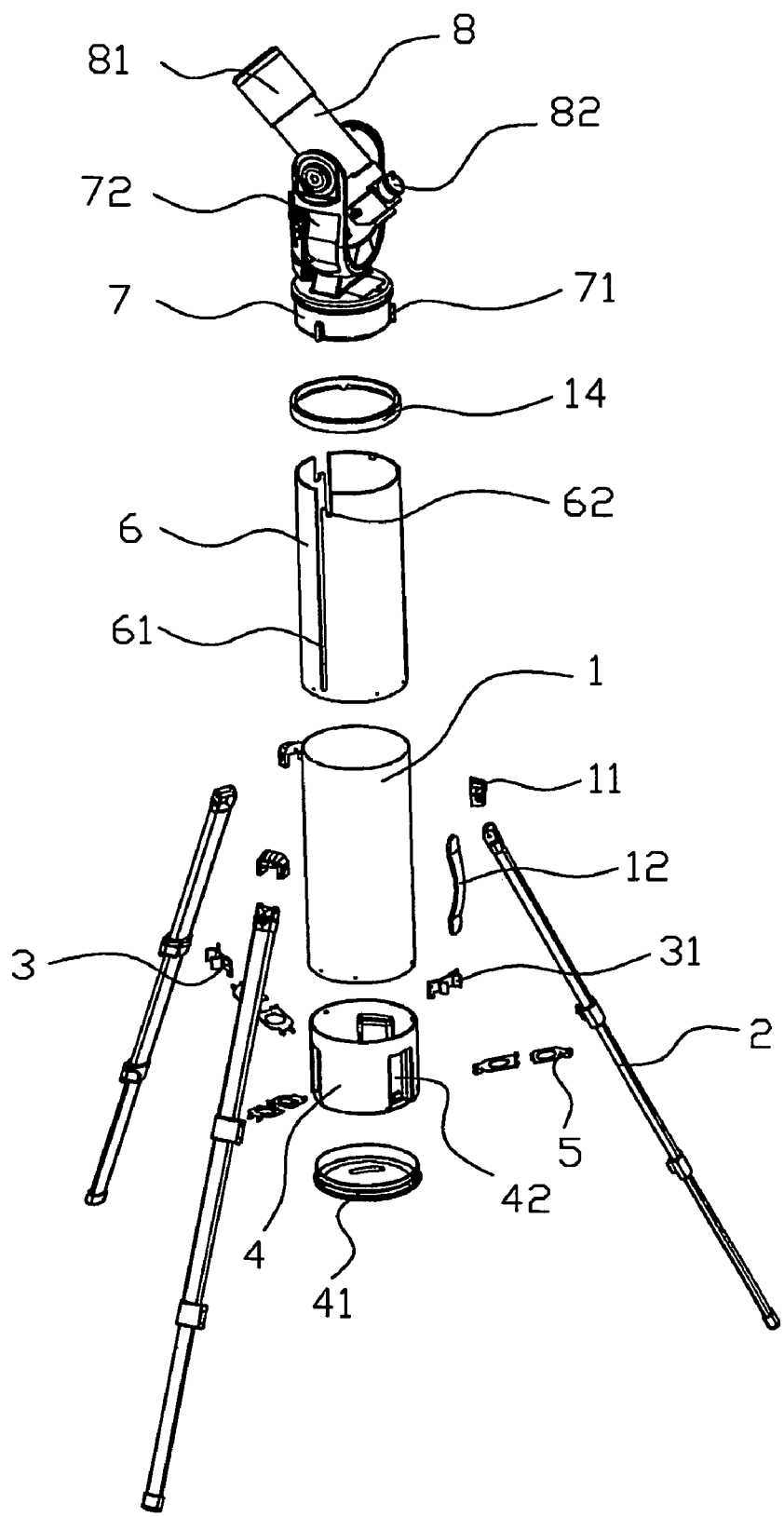
FIG. 2: an exploded view of the embodiment of the invention in the deployed state.
Figure 3:
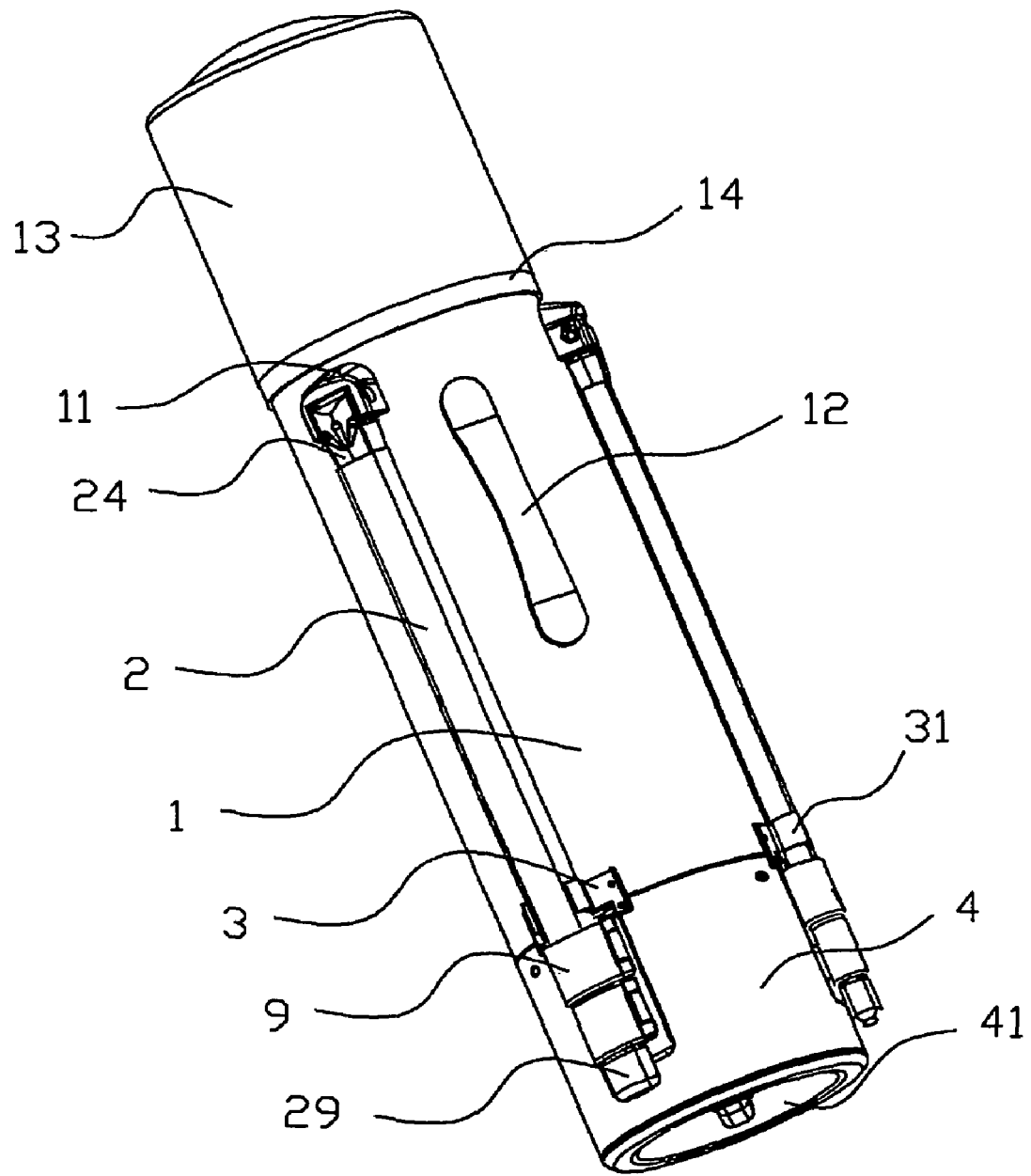
FIG. 3: a perspective assembly view of the embodiment in a folded state.
Figure 4:
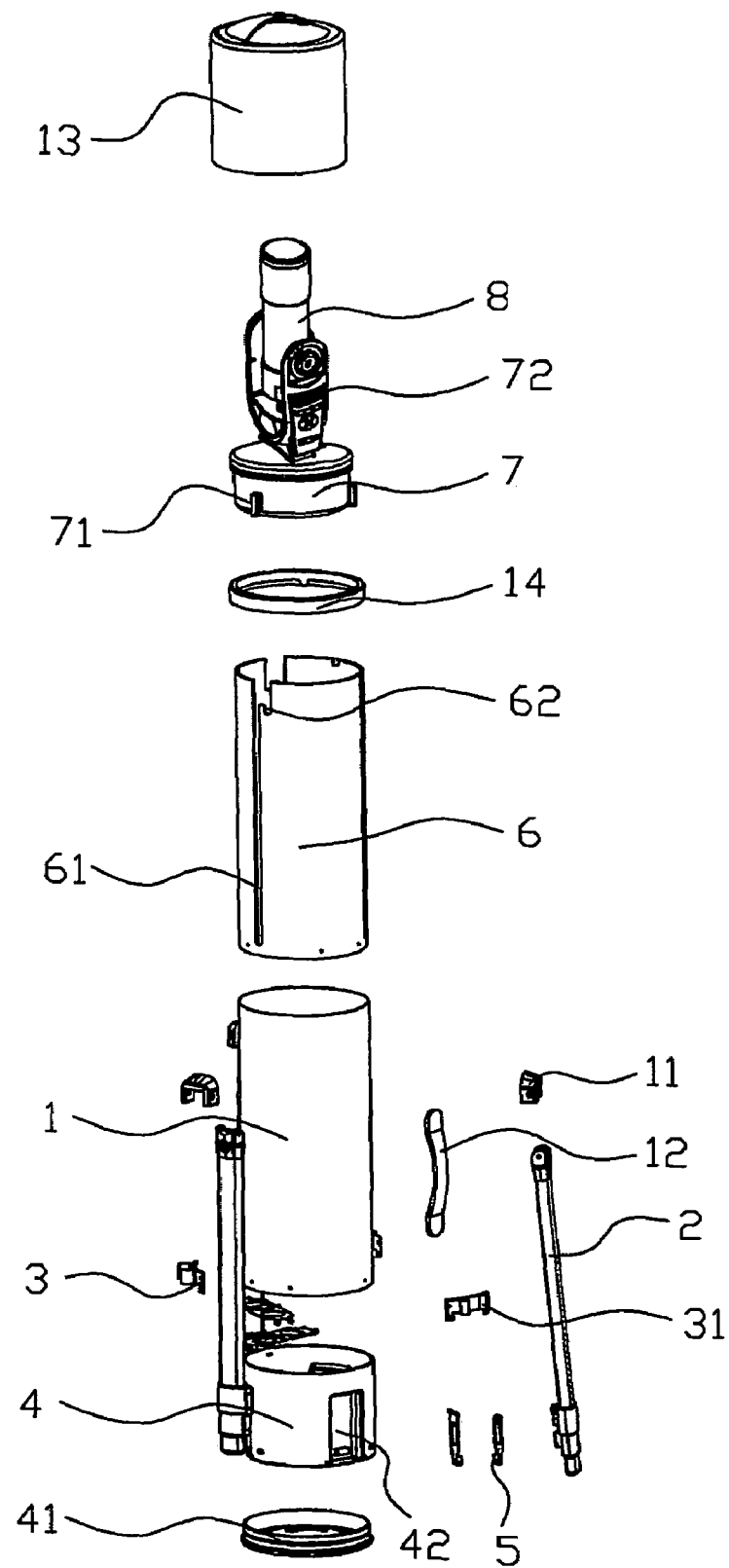
FIG. 4: an exploded view of the embodiment in the folded state.

With reference to FIGS. 1, 2, 3 and 4, the portable astronomical telescope has following features: cylinder body 1, on which three telescopic legs 2 are hinged through a joint support 11 for use as a tripod stand. The bottom of aforementioned cylinder body is fixed by means of connection element 3 and mounted with part box 4. On the bottom of this part box 4, a bottom cover 41 is insert-mounted. On the top of the part box 4, a limit connection element 5 of the telescopic leg 2 is hinge connected. Within the aforementioned cylinder body 1, by means of the mounting bolt of the joint support 11, a guide bushing or sleeve 6 is fixed and installed, in which telescope base 7 is mounted. A guide pin 71 is disposed on the side of this telescope base 7. An L-shaped feed-through slot 61 is established on the side of the guide sleeve 6 to accommodate the guide pin 71. Of course, a spiral-shaped feed-through slot can also be used. A guide pin receiving or residence slot 62 is connected on the tail end of the above feed-through slot 61. The aforementioned telescope base 7 is activated by the lug 72 and mounted with a telescope body 8. The above telescope body 8 comprises an optical system; one objective lens 81 is established at its front side, one visual lens 82 at its rear side. Of course, a telescope body 8 can also be provided as binocular lenses 8 if desired. In order to provide a desirable product appearance, one decorative circle 14 may be established on the aforementioned cylinder body 1, wherein the decorative circle 14 is provided on the cylinder body 1 after the telescope base 7 has been stored within the cylinder body 1. Moreover, in order to facilitate the carrying, a handle 12 is fixed on the upper portion of the cylinder body 1.

Figures 5, 6:
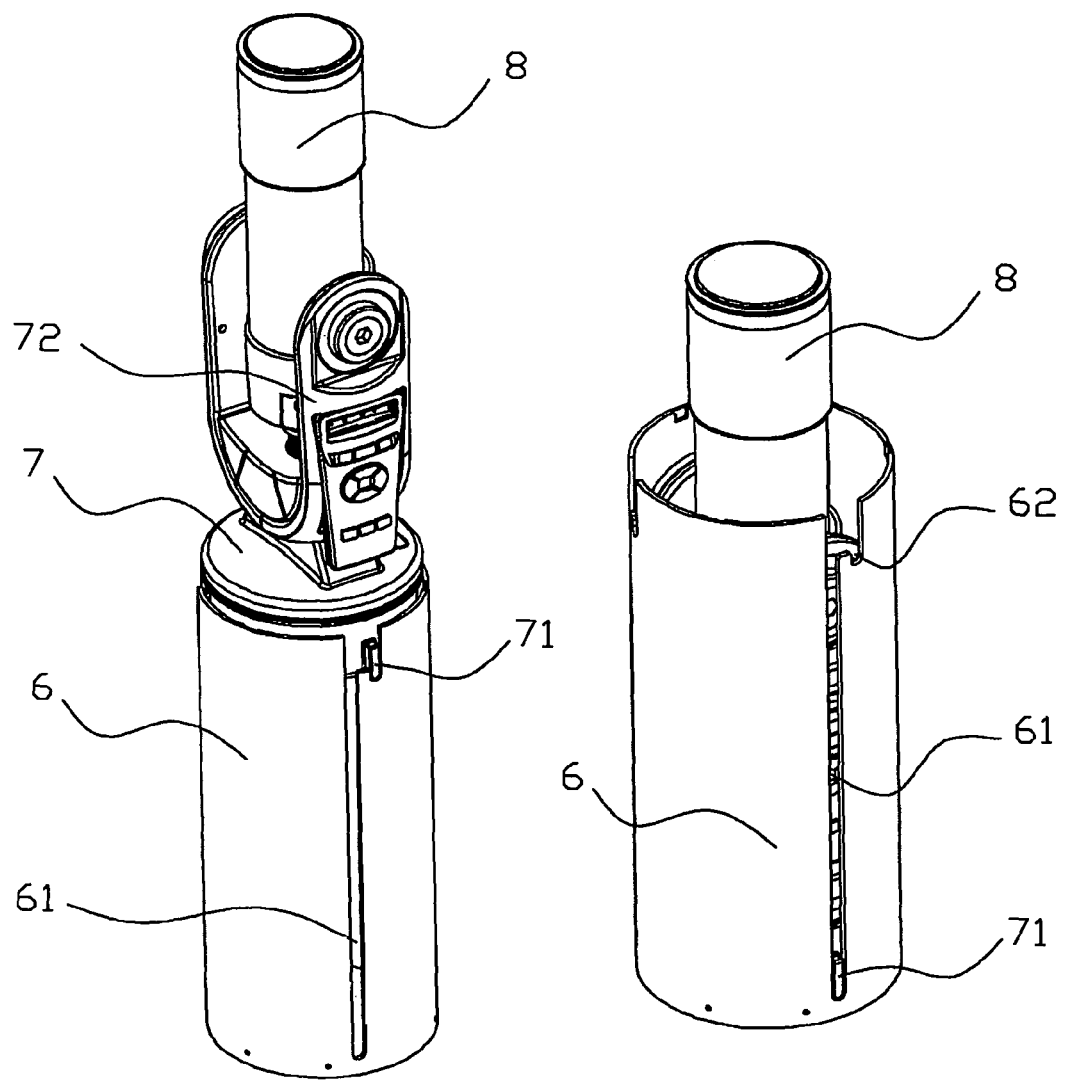
FIG. 5: a perspective view of the base structure in the deployed state
FIG. 6: a perspective view of the base structure in the folded state

With reference to FIGS. 5 and 6, for the telescope base 7 of this product, three pieces of guide pins 71 are evenly distributed along the side circumference. On the side of the above guide sleeve 6, in addition to the guide pin residence slot 62, three L-shaped feed-through slots 61 with the position relative to the guide pin 71 will also be set. This design enables telescope base 7 to implement a more smooth motion in the guide sleeve 6 and more reliable positioning. In addition, the product's limit connection elements 5 are two pieces of active connection elements. Of course, three or more pieces can also be set. In order to guarantee the product appearance effect after folding, a notch 42 will be established on the part box 4 to accommodate the limit connection elements 5. In the meanwhile, in order to guarantee that effect after closing the telescopic leg 2, it can be clamped on the side of the cylinder body 1. On the aforementioned connection element 3, the pipe clip 31 is established to clamping telescopic pipe pieces.

Figure 7:
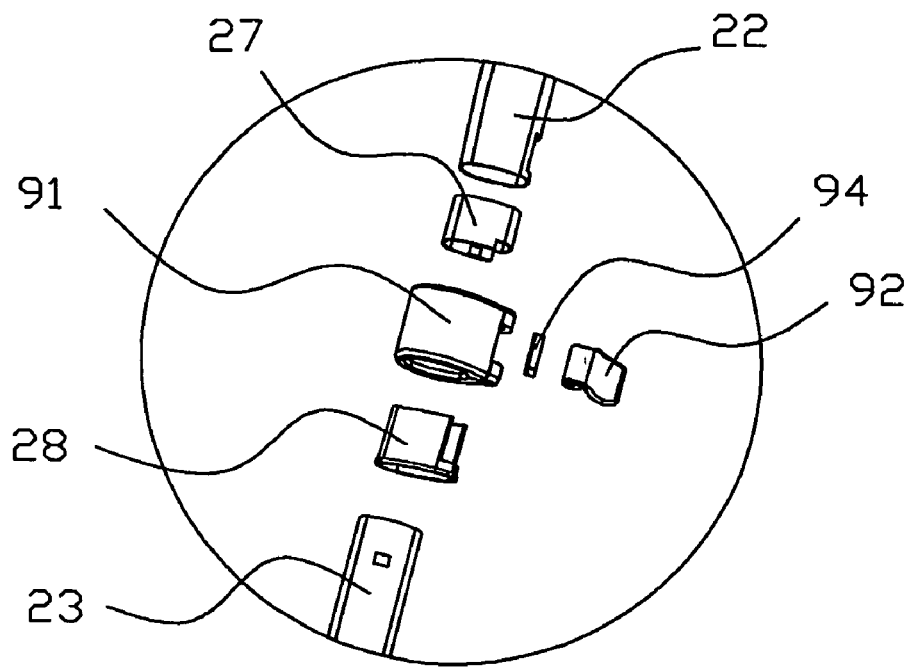
FIG. 7: an exploded view of detail A of FIG. 1
Figure 8:
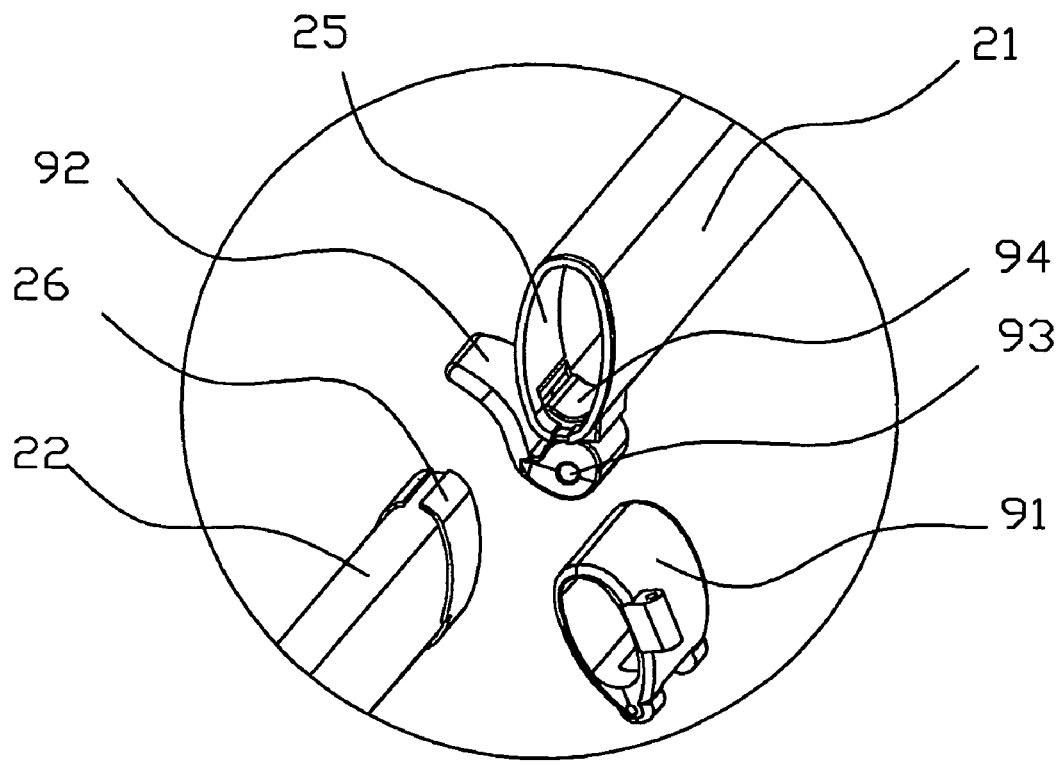
FIG. 8: an exploded view of detail B of FIG. 1

With reference to FIGS. 7 and 8, the telescopic leg 2 used by this product includes three pieces of mutually interlinked inner, middle and outer pipe pieces 21, 22, and 23. In the outer pipe piece 21, the top is encased with the joint 24 hinged on the joint support 11 of cylinder body 1 outer wall, and the lower inner side is provided with one location sleeve 25. In the middle pipe piece 22, the top is encased in a limit sleeve 26, and the lower inner side is provided with one limit sleeve 27 for the middle pipe. In the inner pipe piece 23, the top is encased with a location sleeve 28 for the middle pipe; and the bottom is plugged by a toe sleeve 29. A pipe piece locking device 9 is established at the connection point of aforementioned inner, middle, outer pipe pieces 21, 22, and 23. In accordance with practical customer needs, the telescopic leg 2 can include two or four pieces of mutually interlinked pipe pieces or more.

The above pipe piece locking device 9 incorporates one pipe lock sleeve 91 encased outside of pipe pieces. This lock sleeve 91 is hinged with one lock tongue 92. The hinged hole 93 on the lock tongue 92 adopts the eccentric settings. The pressure block 94 may be tightly pressed on the inner pipe; it can touch the lock tongue 92 mutually. At the time of use, the lock tongue 92 will be rotated outwards around the hinged hole 93. Because the hinged hole 93 on the lock tongue 92 adopts the eccentric setting, therefore, after the lock tongue 92 has rotated outwards, certain clearance will be formed between the pressure block 94 and the inner pipe, such that the inner pipe can exercise the extension/retraction motion. Because the location sleeve is established at the inside of the outer pipe, and because the inner pipe head is encased with limit sleeve, it will be efficiently ensured that the inner pipe cannot be extracted from the outer pipe. If the inner pipe needs to be locked, as long as the lock tongue 92 is rotated inwards, the lock tongue 92 will push the pressure block 94 through the outer pipe and location sleeve opening sequentially; finally press it tightly on the inner pipe, so the pressure block 94 can exert the locking role. Additionally, in order to guarantee clamping effect, the contact surface of the pressure block 94 and inner pipe can be set as arc-shaped.

Of course, the telescopic leg 2 and pipe piece locking device 9 are not limited to aforementioned structure shapes. According to practical needs, a folding pod or plugging-bolt type, or a spinning type pipe piece locking device, etc, can also be put into use. In general, all devices that can attain the technical effect of this embodiment through basically the same means, should belong to the protection scope of this utility model.

When using this product, first of all, deploy the telescopic leg 2, lock it with the pipe piece locking device 9, and erect it in triangular shape on the ground. Then pull the telescope base 7 upwards along the L-shaped feed-through slot 61 of the guide sleeve 6 and rotate the base in a defined angle, so the guide pin 71 on the telescope base 7 can be clamped on the guide pin residence slot 62 at the tail end of the feed-through slot 61. Finally rotate the telescope body 8, and then this product can be used as astronomical telescope. If it is necessary to close it, the telescope body 8 can be rotated to lie in the same straight line with cylinder body 1. Then pull up the telescope base 7, enabling the guide pin 71 on the telescope base 7 to be free of the limitation of the guide pin residence slot 62, pack the telescope base 7 within the cylinder body 1 along the feed-through slot 61. At last, the telescopic leg 2 will be closed and clamped to the pipe clip 31 on the side of the cylinder body 1. Additionally, in order to ensure that the telescope body 8 cannot be easily damaged, the protection cover 13 can also be plugged on the top of the cylinder body 1.

This product can be used without need for separate assembly, and implemented without need for separate package. With small volume and light-weight feature, it can hide the telescope body 8 within the cylinder body 1, in order to play a good protection role, which facilitates the product carrying and movement, particularly suitable for astronomy enthusiasts at the time of outdoor observation activities.

The invention claimed is:

1. A portable astronomical telescope comprising:
a cylinder body, on which three telescopic legs are hinged through a joint support for forming a tripod, the bottom of said cylinder body is fixed by means of a connection element and mounted with a part box, a bottom end of the part box having a bottom cover insert-mounted thereon, a top end of the part box having limit connection elements on which the connected telescopic leg is hinged;
a guide sleeve inside of which a telescope base is mounted, is disposed within the said cylinder body, and on the side of said telescope base, a guide pin is established;
wherein an L-shaped feed-through slot is established to accommodate the guide pin on the side of the guide sleeve, the L-shaped feed-through slot having an end including a guide pin residence slot; and
wherein the telescope base is activated by a lug and is mounted with a telescope body.

2. The portable astronomical telescope in accordance with claim 1, wherein:
the telescopic leg includes three pieces of mutually interlinked inner, middle and outer pipe piece, the outer pipe piece having an upper end hinged coupled to the joint stand and a lower end having an inner side set with a location sleeve, the middle pipe piece having an upper end encased with a limit sleeve, and a lower end having an inner side set with a middle pipe limit sleeve, the inner pipe piece having an upper end having a top encased with a location sleeve for the middle pipe, and the tail is plugged by a toe sleeve, and
a pipe piece locking device is established at a connection point of said inner, middle, outer pipe pieces.

3. The portable astronomical telescope in accordance with claim 2, wherein:
the pipe piece locking device incorporates a pipe lock sleeve encasing an outside of the pipe pieces, the pipe lock sleeve having a hinged lock tongue, the hinged lock tongue having a hinge hole adapted for eccentric settings, and;
a pressure block may be tightly pressed on the inner pipe via the lock tongue.

4. The portable astronomical telescope in accordance with claim 1, wherein:

the limit connection elements comprises two active connection elements, and on the part box, a notch is provided to accommodate the limit connection elements.

5. The portable astronomical telescope in accordance with claim 1, wherein:

a handle is fixed on said cylinder body.

6. The portable astronomical telescope in accordance with claim 1, wherein:

a guard cover is disposed on the top of said cylinder body to protect the telescope body.

7. The portable astronomical telescope in accordance with claim 1, wherein:

the telescope body comprises an optical system including an objective lens and a visual lens.

8. The portable astronomical telescope in accordance with claim 1, wherein:

on the connection element, a pipe clip is provided to clamp the pipe pieces of the telescopic leg.

9. The portable astronomical telescope in accordance with claim 1, wherein:

three pieces of guide pins are evenly distributed along a side circumference of the telescope base, on a side of the guide sleeve, in addition to the guide pin residence slot, three L-shaped feed-through slots with the positions relative to the guide pin will also be set.

10. The portable astronomical telescope in accordance with claim 1, wherein:

on said cylinder body, a decorative circle is provided on said cylinder body after the telescope base has been stored within said cylinder body.

* * * * *